United States Patent
Millar et al.

(10) Patent No.: US 9,917,712 B2
(45) Date of Patent: Mar. 13, 2018

(54) FREQUENCY DOMAIN EQUALIZER FOR OPTICAL COMMUNICATIONS

(71) Applicant: Mitsubishi Electric Research Laboratories, Inc., Cambridge, MA (US)

(72) Inventors: David Millar, Winchester, MA (US); Milen Paskov, London (GB); Toshiaki Koike Akino, Malden, MA (US); Kieran Parsons, Cambdirge, MA (US); Keisuke Kojima, Weston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 20 days.

(21) Appl. No.: 15/068,888

(22) Filed: Mar. 14, 2016

(65) Prior Publication Data

US 2017/0264468 A1   Sep. 14, 2017

(51) Int. Cl.
 *H04B 10/06* (2006.01)
 *H04L 25/03* (2006.01)
 *H04B 10/61* (2013.01)

(52) U.S. Cl.
 CPC ....... *H04L 25/03891* (2013.01); *H04B 10/61* (2013.01); *H04B 10/6161* (2013.01); *H04B 10/6162* (2013.01)

(58) Field of Classification Search
 CPC .......... H04L 25/03891; H04B 10/6161; H04B 10/61; H04B 10/6162
 USPC ........................................................ 398/208
 See application file for complete search history.

(56) References Cited

U.S. PATENT DOCUMENTS

2012/0114341 A1   5/2012  Hu et al.
2013/0302041 A1*  11/2013 Matsui ............... H04B 10/6161
                                                                    398/208

OTHER PUBLICATIONS

Millar, D.S., Lavery, D., Maher, R., Thomsen, B.C., Bayvel, P., Savory, S.J., "A Baud-Rate Sampled Coherent Transceiver with Digital Pulse Shaping and Interpolation", OFC 2013.
Shah, S.F.A., Li, C., Zhang, Z., "Low-complexity Fractionally Spaced Equalizer with Non-integer Sub-symbol Sampling for Coherent Optical Receivers", SPPCom 2015.
Kikuchi, K., "Performance Analyses of Digital Coherent Receivers with Symbol-rate Analog-to-digital Conversion", SPPCom 2015.
Pittala, F., Nossek, J.A., "Efficient Frequency-Domain Fractionally-Spaced Equalizer for Flexible Digital Coherent Optical Networks", Optical Communication (ECOC), 2015 European Conference on p. 3.14.
Ip, E., Kahn, J.M., "Digital Equalization of Chromatic Dispersion and Polarization Mode Dispersion", Lightwave Technology, Journal of 2007.

(Continued)

*Primary Examiner* — M. R. Sedighian
(74) *Attorney, Agent, or Firm* — Gene Vinokur; James McAleenan; Hironori Tsukamoto

(57) ABSTRACT

A method decodes an optical signal transmitted over an optical channel from a transmitter to a receiver. The receiver receives the transmitted optical signal to produce a digital signal which is filtered in the frequency domain for compensating static effects and/or dynamic effects. The filtering is performed in the frequency domain, while the frequency coefficients of the filter are updated in the time domain by updating at least some of time coefficients of the filter and transforming the time coefficients into the frequency domain.

10 Claims, 13 Drawing Sheets

(56) References Cited

OTHER PUBLICATIONS

Shynk, J.J., "Frequency-domain and multirate adaptive filtering", Signal Processing Magazine, IEEE, 1992.
Erup, L., Gardner, F.M., Harris, R.A., "Interpolation in digital modems. II. Implementation and performance", Communications, IEEE Transactions on 1993.
Kudo et al. "Coherent optical single carrier transmission using overlap frequency domain equalization for long-haul optical systems," Journal of lightwave technology, IEEE service center, NY, NY, US. vol. 27, No. 16. Aug. 15, 2009. p. 3721-3728.

\* cited by examiner

FREQUENCY DOMAIN EQUALIZER FOR OPTICAL COMMUNICATIONS

FIELD OF THE INVENTION

This invention relates generally to coherent optical communications systems, and more particularly to decoding data transmitted over an optical channel.

BACKGROUND OF THE INVENTION

The increase in bandwidth demand for optical links, such as links found in long-haul optical networks, is necessitating a rapid increase in the capacity of optical links. For instance, the per-wavelength capacities of optical links in some optical communication systems are exceeding 100 gigabits per second (Gb/s). Moreover, to meet future capacity demands for optical networks, next generation optical communication systems are being designed to sustain capacities that reach multi-terabits per second (Tb/s). Although the demand to increase bandwidth and throughput continue to grow, designs for the optical systems are often constrained by cost, power, and size requirements.

For example, inaccuracies in carrier-phase estimation and amplitude equalization cause distortions, i.e., the noise enhancements, which reduce the performance of optical communications systems. In the optical communications, different methods are used to reduce the distortion. Those methods are based on a hard decision for determining the phase and amplitude of the received signal. For example, a decision-directed least-mean-square (LMS) method uses the hard decision for determining the error for the updating.

However, different types of distortions can require different types of filters for equalizing the distortion. The optimal combination of those multiple filters is a desirable cost effective option that is usually difficult to achieve. For example, the equalization of chromatic dispersion is usually performed in the frequency domain over a longer response length. In optics, the chromatic dispersion is the phenomenon in which the group velocity of a wave depends on its frequency. The equalization of the chromatic dispersion can be performed using a static filter with constant coefficients.

Conversely, the equalization of the polarization of the optical signal is a rapid time varying process due to the changes in the channel conditions. The equalization of the polarization can be done with dynamic filter that requires a periodic update of its coefficients. The combination of the static and dynamic filters can be challenging.

Accordingly, there is a need to improve the equalization of the optical signal transmitted over the optical channel.

SUMMARY OF THE INVENTION

Some embodiments of the invention are based on the realization that combined equalization of chromatic dispersion and other effects such as polarization mode dispersion can be performed advantageously in the frequency domain. This is because the filter responses due to chromatic dispersion and other effects may be applied in the frequency domain, with adaptation of only a small number of time-domain coefficients, without separating the filtering of chromatic dispersion and other effects.

Specifically, some embodiment are based on recognition that due to the length, i.e., a number of taps or coefficients, of a filter suitable for optical communication, the filtering operation is more efficient in a frequency domain rather than in a time domain. This is because the filtering in the frequency domains can be done in blocks, but the filtering in the time domain is performed element by element. However, it is further recognized that the updates of the coefficients of the filter is more efficient in the time domain rather than in the frequency domain. This is because it is impractical to update only part of the coefficients in the frequency domain. However, in some situations, updating all taps is undesirable, and the updates in time domain can add additional flexibility. For example, update of all coefficients in the frequency domain can increase tap noise of the filter.

To that end, some embodiments of the invention perform the filtering operations in the frequency domain, while updating the coefficients of filter the in the time domain.

Some other embodiments of the invention are based on the realization that the combined equalizer input sampling rate can be reduced from two samples per symbol to any rate greater than one sample per symbol, without adversely affecting performance. This is advantageous as the number of coefficients required by the filter may be reduced, therefore reducing the complexity of the filter.

Some other embodiments of the invention are based on the realization that by calculating the time coefficients in the time domain for a subset of output symbols, an output error term may be calculated with reduced complexity. Some embodiments use an error term only determined on pilot symbols, while some other embodiments use an error term determined on a subset of unknown output symbols.

Accordingly, one embodiment discloses a method for decoding an optical signal transmitted over an optical channel from a transmitter to a receiver. The method includes transforming the optical signal received in a time domain over the optical channel into a frequency domain to produce a discrete spectrum; updating at least some of time coefficients of a filter for filtering in the time domain; transforming the time coefficients into the frequency domain to produce frequency coefficients of the filter for filtering in the frequency domain; filtering the discrete spectrum in the frequency domain using the frequency coefficients of the filter; transforming the filtered discrete spectrum into a digital signal in the time domain; and decoding symbols of the digital signal. The steps of the method are performed using a processor of the receiver.

Another embodiment discloses a method for decoding an optical signal transmitted over an optical channel from a transmitter to a receiver. The method includes receiving the optical signal transmitted over the optical channel to produce a digital signal in a time domain; partitioning the digital signal in the time domain into a set of overlapping blocks of samples; transforming a block of samples into a frequency domain to produce a discrete spectrum; filtering the discrete spectrum with a static filter to produce a first filtered spectrum; filtering the first filtered spectrum with a dynamic filter to produce a second filtered spectrum; transforming the first filtered spectrum into the time domain to produce a first signal; transforming the second filtered spectrum into the time domain to produce a second signal; determining time coefficients of the dynamic filter in the time domain based on a difference between at least some elements of the first and the second signals; updating the time coefficients by replacing a subset of time coefficients with zeros; transforming the updated time coefficients into the frequency domain; updating frequency coefficients of the dynamic filter in the frequency domain with the updated time coefficients transformed into the frequency domain; and reconstructing the optical signal in the time domain using a set of second digital signals corresponding to the set of overlapping blocks of samples. The steps of the method are performed using a processor of the receiver.

Yet another embodiment discloses a receiver for receiving and decoding an optical signal transmitted over an optical channel including a frond end including an optic and an electronic for receiving the optical signal in a time domain over the optical channel and transforming the optical signal into a frequency domain to produce a discrete spectrum; a digital signal processor for filtering the discrete spectrum in the frequency domain using frequency coefficients of a filter and for transforming the filtered discrete spectrum into a digital signal in the time domain, wherein the processor updates at least some of time coefficients of the filter for filtering in the time domain and transforms the time coefficients into the frequency domain to produce the frequency coefficients of the filter; and a decoder for decoding symbols of the digital signal.

DETAILED DESCRIPTION OF THE PREFERRED EMBODIMENTS

Figure 1A:
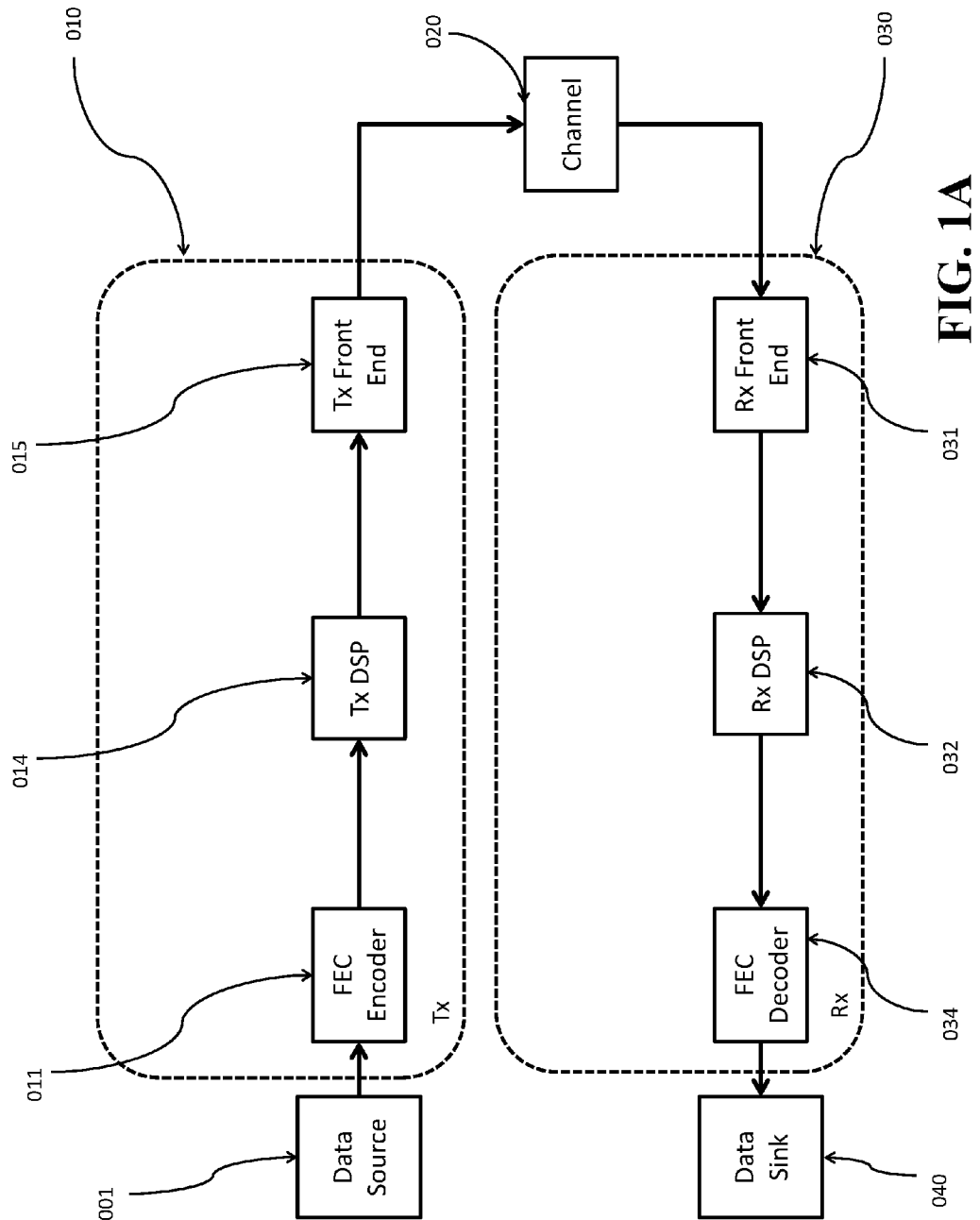
FIG. 1A is a block diagram of an optical communications system according to some embodiments of the invention.

FIG. 1A shows a block diagram of an optical communications system according to some embodiments of the invention. Data from a source (001) are sent to a transmitter (Tx) (010). For example, in the transmitter, the data are sent to an optional forward error correction (FEC) encoder (011) and then the encoded signal is processed by a digital signal processor (DSP) (014). In some embodiments, the DSP also performs various functions such as mapping, filtering and pre-equalization of the signal. The signal is then sent to the transmitter front end (015), where analog operations such as amplification, filtering, modulation and up-conversion occur, and then transmitted over an optical channel (020) to a receiver (Rx) (030).

At the receiver, the signal passes through the receiver front end (031) for performing analog operations such as down-conversion, amplification, filtering and quantization of the received signal to produce a digital signal. The digital signal is processed by the receiver DSP (032) in order to improve accuracy of the equalization and carrier phase recovery. The processed signal is then optionally sent for FEC decoding (034), before being sent to a destination, e.g., a data sink (040).

Figure 1B:
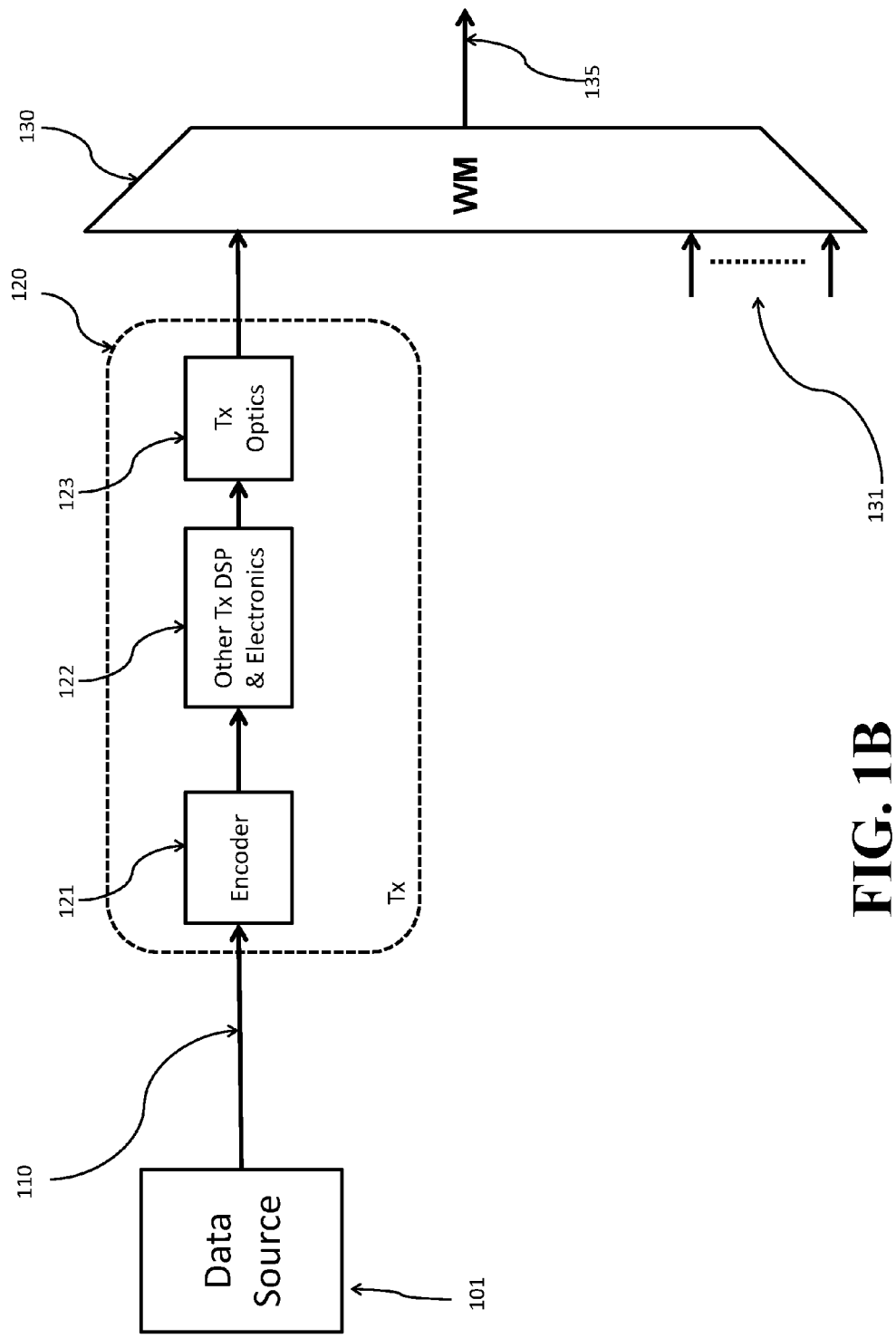
FIG. 1B is a block diagram of a transmitter for an optical communications system according to one embodiment of the invention.

FIG. 1B shows a block diagram of a transmitter for an optical communications system according to one embodiment of the invention. Data (110) from a source (101) are sent to a transmitter (120). In the transmitter, the data is encoded by an FEC encoder (121). The signal then undergoes processing with the DSP and other front end electronics (122) such as analog-to-digital convertors. The signal is then sent to the transmitter optics (123) for modulation on to the optical carrier. The optical signal is then sent to a wavelength multiplexer (WM) (130), where the signal can be optionally combined with other optical signals which have different wavelengths (131), before being sent to the optical channel (135).

Figure 1C:
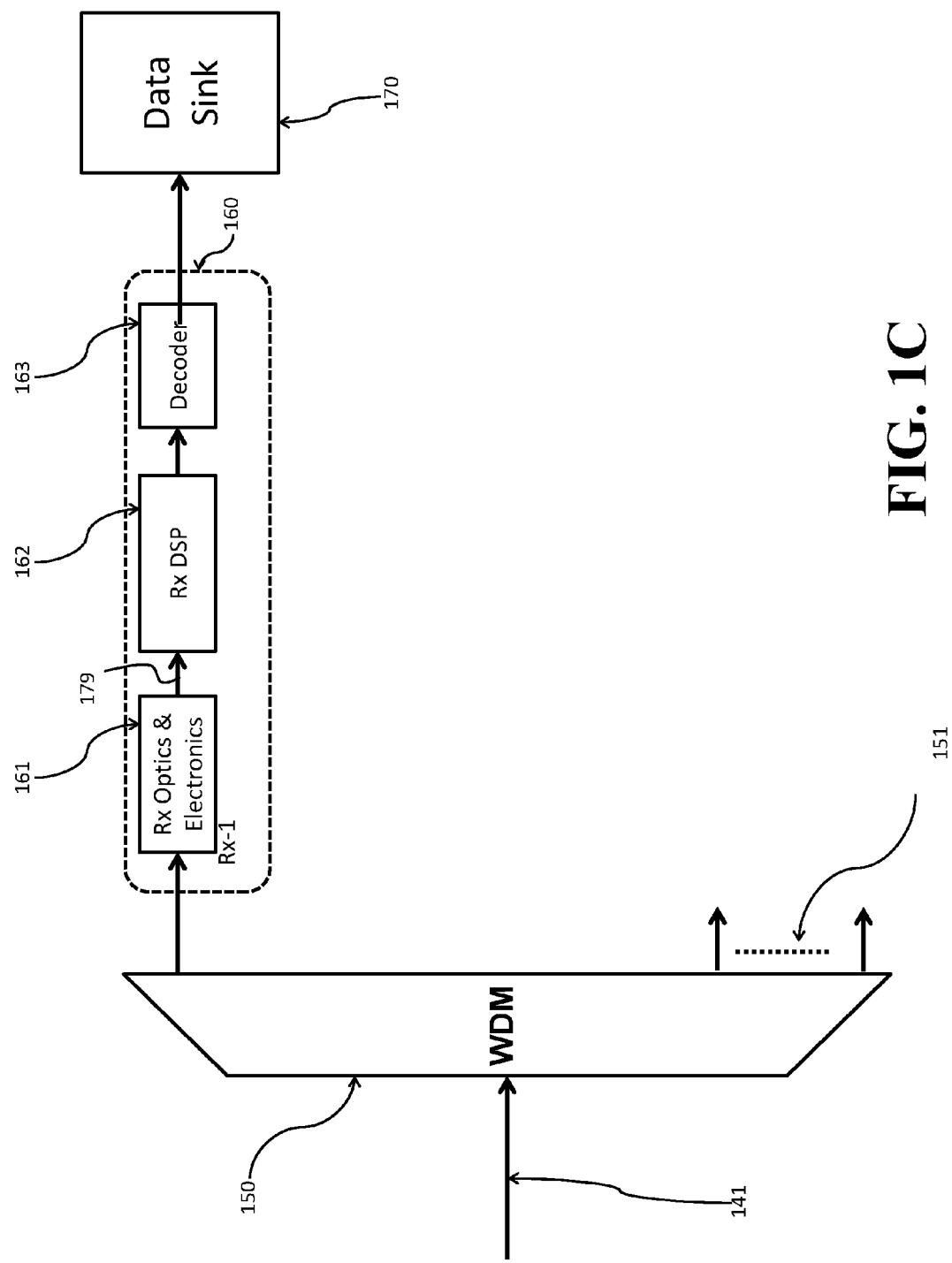
FIG. 1C is a block diagram of a receiver for an optical communications system according to one embodiment of the invention.

FIG. 1C shows a block diagram of a receiver in the optical communications system according to one embodiment of the invention. The signal from the optical channel (141) is sent to a wavelength de-multiplexer (WDM) (150). Other wavelengths (151) are optionally sent to other receivers for processing independently of the wavelength channel of interest. The signal is then sent to the receiver (160). The optical signal is detected by the optical receiver front end (161). This block can include both optical and electronic elements, such as down-conversion, amplification, and quantization to produce a digital signal 179. The digital signal is then processed by DSP (162), including filtering or equalization of amplitude and phase distortions. The processed signal is then sent decoder (163) to produce soft-decision information for FEC decoding, before being sent to its final destination, e.g., the data sink (170).

Figure 1D:
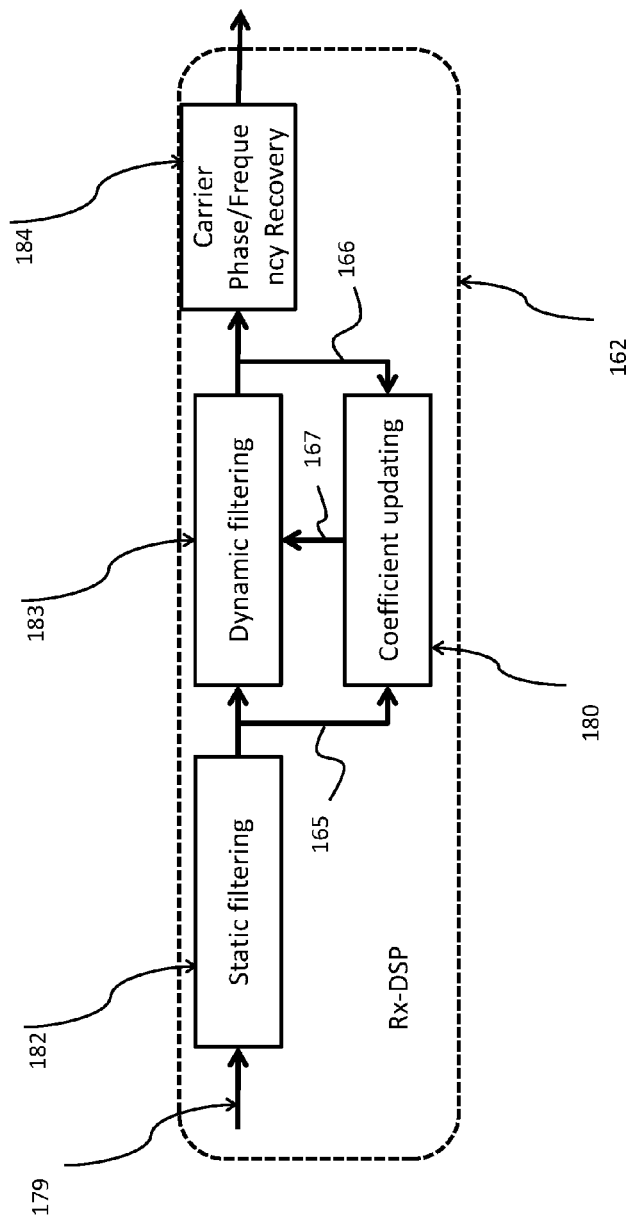
FIG. 1D is a block diagram of the receiver digital signal processing algorithms used in an optical communications system, according to one embodiment of the invention.

FIG. 1D shows a block diagram of the digital signal processing of the DSP 162 according to one embodiment of the invention. For example, the DSP can optionally perform a static filtering (182) of the signal is then performed to compensate for time-invariant effects such as chromatic dispersion and pulse shaping, which in some cases have long response lengths. To that end, in some embodiments the static filtering is performed with static filter having constant coefficients.

Additionally or alternatively, the DSP 162 performs dynamic filtering (183) to correct for unknown distortions (such as those due to electrical filtering), and time-varying distortions such as polarization mode dispersion, which typically have a much shorter response length. The coefficients of the dynamic filter are updated (180) based on the input and output of the dynamic filter, using, e.g., a least mean square (LMS) method. Separate recovery of carrier frequency and phase is then optionally performed (184) to compensate for the difference in optical frequency between the transmitter and receiver lasers, and the random fluctuations in their phases.

Some embodiment are based on recognition that due to the length, i.e., a number of taps or coefficients, of a filter suitable for optical communication, the filtering operation is more efficient in a frequency domain rather than in a time domain. This is because the filtering in the frequency domains can be done in blocks, but the filtering in the time domain is performed element by element. However, it is further recognized that the updates of the coefficients of the filter is more efficient in the time domain rather than in the frequency domain. This is because it is impractical to update only part of the coefficients in the frequency domain. However, in some situations, updating all taps is undesirable, and the updates in time domain can add additional flexibility. For example, update of all coefficients in the frequency domain can increase tap noise of the filter.

Figure 1E:
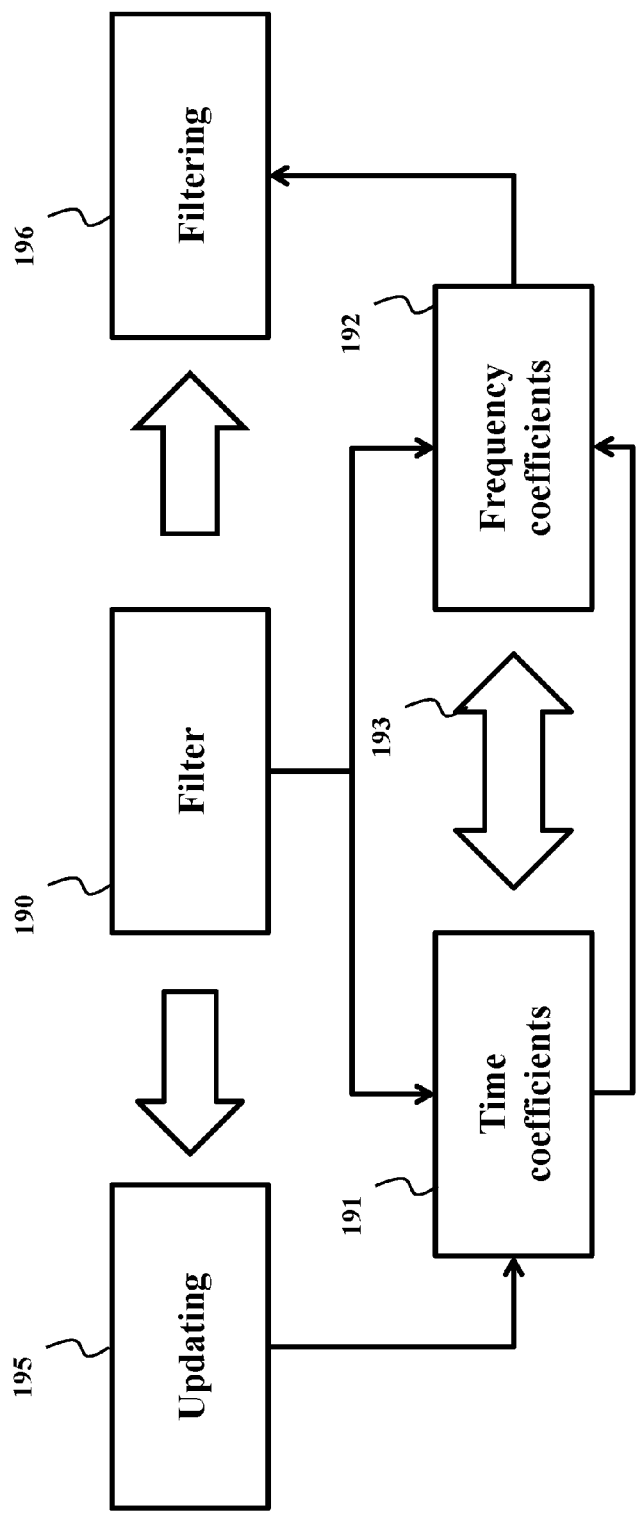
FIG. 1E is a schematic of a filter for filtering in the frequency domain with coefficients updated in the time domain according to some embodiments of the invention.

FIG. 1E shows a schematic of a filter 190 for filtering in the frequency domain with coefficients updated in the time domain according to some embodiments of the invention. The filter filters using coefficients of the filter that depends on domain of the filtering. For example, the filter can have time coefficients 191 for filtering in the time domain or frequency coefficients 192 for filtering in the frequency domain. The time coefficients 191 and the frequency coefficients 192 are related to each other. For example, the time coefficients 191 can be transformed into the frequency coefficients 192 using a Furrier transform 193.

Similarly, the frequency coefficients 192 can be transformed into the time coefficients 191 using the inverse Furrier transform 193. Some embodiments of the invention perform the filtering 196 operations of the filter 190 in the frequency domain using the frequency coefficients 191. However, the frequency coefficients are updated 195 in the time domain through the update of at least some of the time coefficients.

For example, refereeing back to FIG. 1D, the digital signal or digital spectrum in the frequency domain before being filtered by the dynamic filter 183 is transformed into the time domain to produce a first signal 165. The filtered digital spectrum, i.e., after being filtered by the dynamic filter 183, is also transformed into the time domain to produce a second signal 166. The update 180 determines time coefficients of the filter in the time domain based on a function of the first 165 and the second 166 signals and transforms 167 at least part of the time coefficients in the frequency domain to update the frequency coefficients.

Figure 1F:
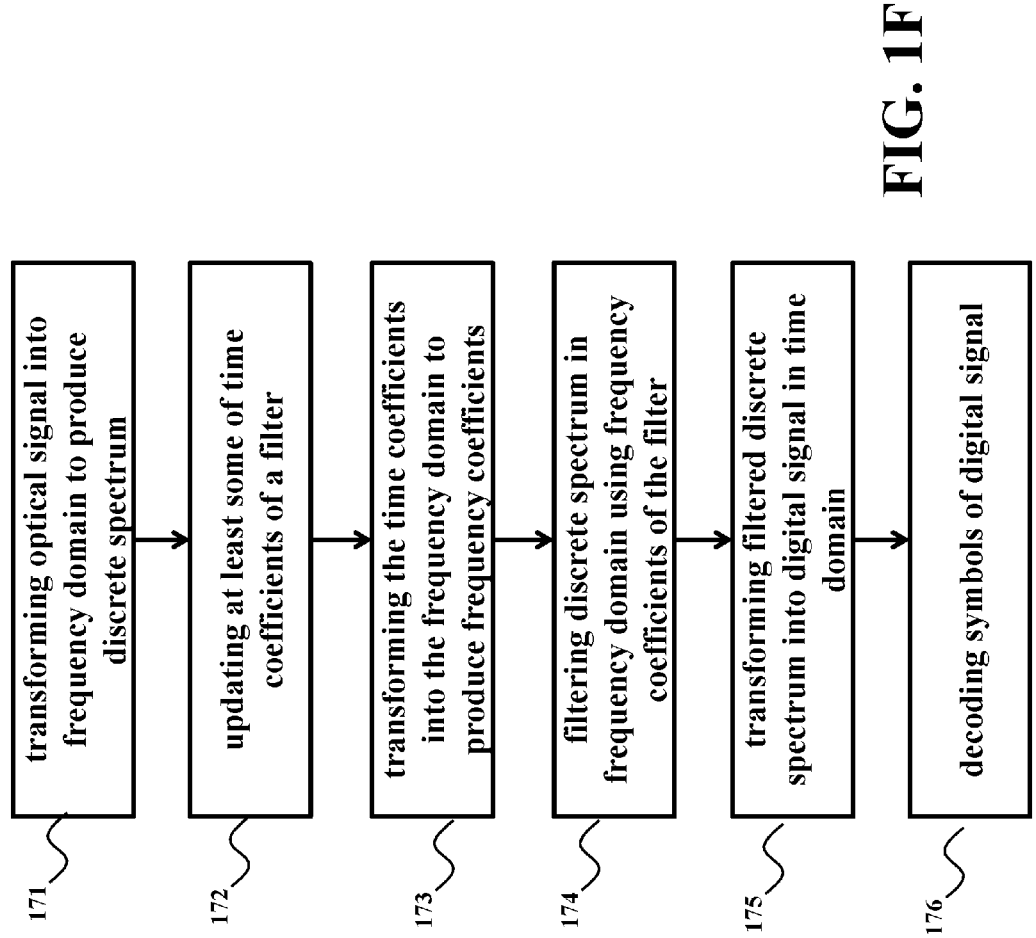
FIG. 1F is a flow chart of a method for decoding an optical signal transmitted over an optical channel from a transmitter to a receiver according to one embodiment of the invention.

FIG. 1F shows a flow chart of a method for decoding an optical signal transmitted over an optical channel from a transmitter to a receiver according to one embodiment of the invention. The embodiment transforms 171 the optical signal received in a time domain over the optical channel into a frequency domain to produce a discrete spectrum. The embodiment updates 172 at least some of time coefficients of a filter for filtering in the time domain and transforms 173 the time coefficients into the frequency domain to produce frequency coefficients of the filter for filtering in the frequency domain. The embodiment filters 174 the discrete spectrum in the frequency domain using the frequency coefficients of the filter, transforms 175 the filtered discrete spectrum into a digital signal in the time domain, and decodes 176 symbols of the digital signal. The steps of the method are performed using a processor of the receiver, e.g., the DSP 32.

Figure 2:
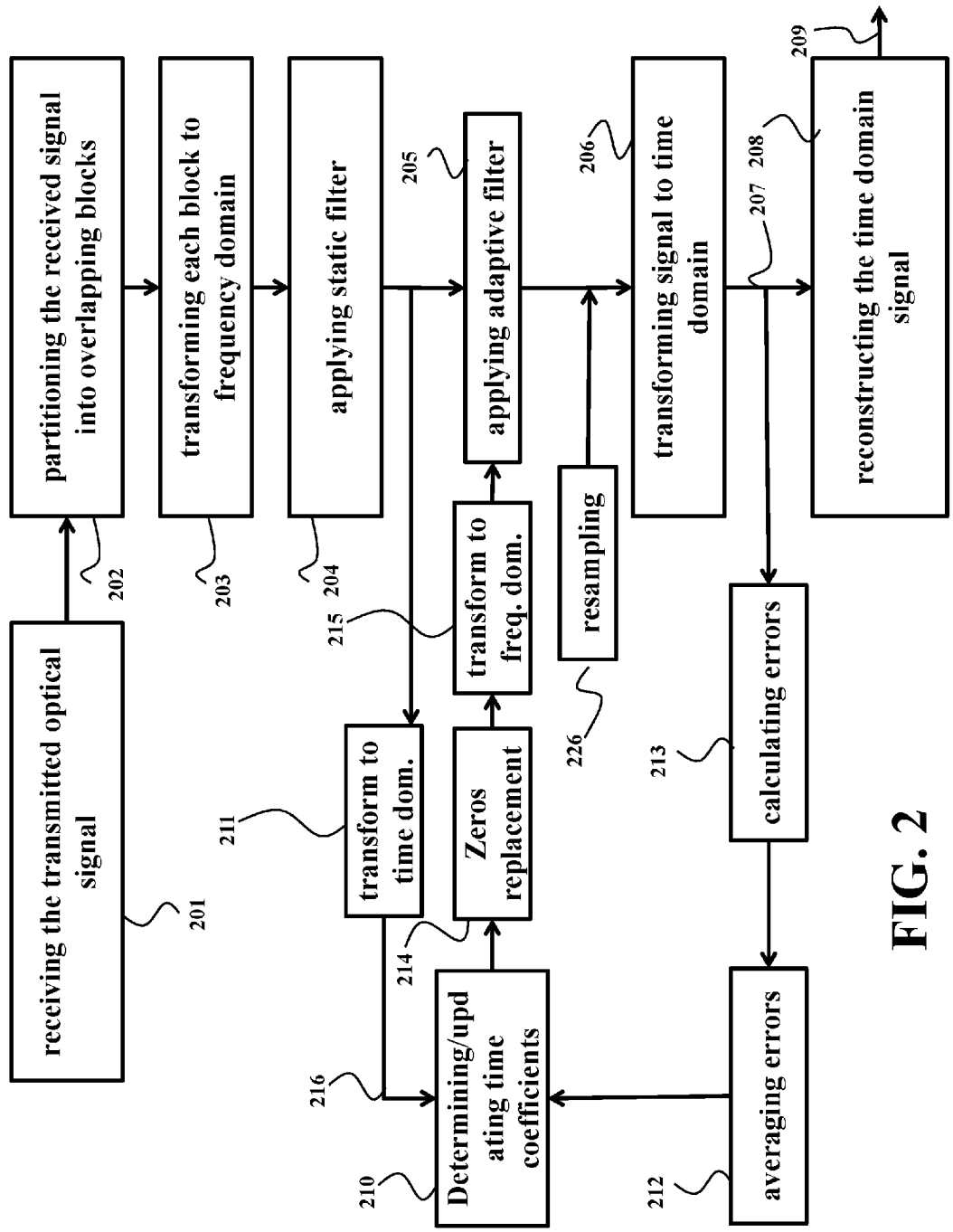
FIG. 2 is a block diagram of a method for decoding an optical signal transmitted over an optical channel from a transmitter to a receiver according to one embodiment of the invention.

FIG. 2 shows a block diagram of a method for filtering in the frequency domain according to some embodiments of the invention. In those embodiments, the filter 190 includes a static filter, e.g., the filter 182, for filtering static effects of the optical channel and a dynamic filter, e.g., the filter 183, for filtering dynamic effects of the optical channel. The frequency coefficients of the static filter are constant; however, the frequency coefficients of the dynamic filter are updated in the time domain.

For example, one embodiment receives 201 the optical signal transmitted over the optical channel and converts the optical signal into a digital signal in a time domain. The digital signal is partitioned 202 in the time domain into a set of overlapping blocks of samples, and each block of samples is then transformed 203 into a frequency domain using, e.g. the fast Fourier transform, to produce a discrete spectrum. In different embodiments of the invention, the block of samples includes integer or rational number of samples per symbol to be decoded. For example, in one embodiment, each symbol is encoded with two samples. In alternative embodiment, the block of samples includes more than one but less than two samples per symbol.

For example, the optical receiver detects a signal $E_k$ at time instant k. The signal is then partitioned into overlapping blocks with length 2N, where N is strictly greater than the length of the channel response. In some cases, the overlap with consecutive blocks may be half of the block length. In this case, we will define a block $B_j=[E_{k+1}, \ldots, E_{k+2N}]$ and its adjacent block $B_{j+1}=[E_{k+N+1}, \ldots, E_{k+3N}]$. Next, the embodiment filters 204 the discrete spectrum with a static filter to produce a first filtered spectrum and filters 205 the first filtered spectrum with a dynamic filter to produce a second filtered spectrum. Next, the embodiment transforms 206 the second filtered spectrum into the time domain to produce a second signal 207, which is used for reconstructing 208 the optical signal 209 in the time domain. For example, a set of second digital signals corresponding to the set of overlapping blocks of samples can be used for reconstructing the optical signal 209 using, e.g., an overlap-add or an overlap-save methods.

For example, the overlap-save method may be described with the following pseudo-code:

```
h=FIR_impulse_response;
M=length(h);
overlap=M-1;
N=4*overlap;
step_size=N-overlap;
H=DFT(h, N);
position=0;
while (position+N<=length(x))
  yt=IDFT(DFT(x(1+position:N+position), N)*H, N);
  y(1+position:step_size+position)=yt(M:N);
  position=position+step_size;
end
```

The embodiment also updates the frequency coefficients of the dynamic filter in time domain. For example, in order to update the frequency coefficients of the dynamic filter, the embodiment, e.g., periodically or in response to a triggering event, transforms 211 the first filtered spectrum into the time domain to produce a first signal 216, transforms 206 the second filtered spectrum into the time domain to produce a second signal 207, and determines 210 time coefficients of the dynamic filter in the time domain based on a difference between at least some elements of the first and the second signals. For example, the time coefficients can be determined and/or updated using the first signal adjusted according to an error between at least some samples in the second signal and a set of predetermined values. To that end, some embodiments calculates the error (213) on the corresponding output block, and are optionally filtered, e.g., averaging (212), before adjusting the first signal.

For example, the instantaneous time domain outputs 207 of the 2×2 MIMO filter 205 are given by:

$$v_x = h_{xx} u_x^H + h_{yx} u_y^H$$

$$v_y = h_{xy} u_x^H + h_{yy} u_y^H$$

where $u_x$ and $u_y$ are the time domain input vectors 216 on the x and y polarizations respectively, $h_{xx}$, $h_{yx}$, $h_{xy}$, and $h_{yy}$ are the coefficients of the four FIR filters, $v_x$ and $v_y$ are the instantaneous time domain outputs taken from the output block 207 on the x and y polarizations respectively, and the $^H$ operator is the Hermite vector transpose.

One embodiment calculates the error terms 213 according to the radiuses of the equalized signals 207 on each polarization, according to (for example), the constant modulus algorithm:

$$e_x = 1 - |v_x|^2$$

$$e_y = 1 - |v_y|^2$$

where $e_x$ and $e_y$ are the error terms on the x and y polarizations respectively.

Additionally, one embodiment can further refine our error term calculation by using a filtered version of the error term 212, given in the case of a gliding window accumulator filter as:

$$e_{x'} = \sum_{n=1}^{M} e_x(n)/M$$

$$e_{y'} = \sum_{n=1}^{M} e_y(n)/M$$

where $e_{x'}$ and $e_{y'}$ are the averaged error terms on the x and y polarizations respectively, and M is the number of error terms which are averaged.

The coefficients of the filter 210 is determined using the error term and some adaptation algorithm, for example, the least mean square (LMS) algorithm, which is determined by the following set of equations:

$$h_{xx}' = h_{xx} + \mu e_x u_x v_x^*$$

$$h_{yx}' = h_{yx} + \mu e_x u_y v_x^*$$

$$h_{xy}' = h_{xy} + \mu e_y u_x v_y^*$$

$$h_{yy}' = h_{yy} + \mu e_y u_y v_y^*$$

where the vectors $h_{xx}'$, $h_{yx}'$, $h_{xy}'$ and $h_{yy}'$ are the updated filter coefficient vectors, * is the conjugate operator, $\mu$ is the equalizer convergence parameter. We then pad the updated coefficients with zeros 214, such that they are the same length as the frequency domain filter, before transforming them into the frequency domain with an algorithm such as the fast Fourier transform 215.

Some embodiments of the invention are based on a realization that updates only part of the coefficients of the dynamic filter in response to a change of condition in the optical channel can reduce the tap noise of the filter. However, it is impractical to update only part of the coefficients in the frequency domain, because a change in a single time domain coefficient affects all frequency domain coefficients.

However, it is possible to update only part of the time coefficients, because of the sparseness of the desired adaptive response in the time domain. To that end, some embodiments update only part of the time coefficients in the time domain. For example, after determining 210 the time coefficients, one embodiment updates 214 the time coefficients by replacing a subset of time coefficients with zeros. Such a replacement preserve only those time coefficients that are decided to be updated, and only those remained time coefficients are transformed 215 in the frequency domain to update the frequency coefficients of the dynamic filter. For example, we may decide to update only the taps which are central in the time domain, in order to compensate for polarization mode dispersion, which is dynamic, and has only a short response length. All coefficient update terms other than the central coefficients are set to zero, and therefore are not updated.

Some embodiments of the invention are based on recognition that a multiple samples per symbols can be used in the optical transmission to account for uncertainties of the optical channel. Usually, each symbol is encoded with the integer number of samples, e.g., two samples per symbol, because such a sampling simplifies the filtering due to direct correspondence between the samples and the symbols.

However, some embodiments are based on a realization that reducing a number of samples per symbol to a rational number between one and two reduces the complexity of the filtering, but eliminate the direct correspondence between the samples and the symbols. Specifically, when the ratio of the samples to the symbols is a rational number, e.g., the overlapping blocks of samples have more than one but less than two samples per symbol; one sample can carry information of multiple symbols. However, some embodiments are based on a realization that it is possible to use rational number of symbols for the filtering accompanied with the subsequent resampling operation that resamples the filtered signal to an integer number of samples per symbol. Despite of the additional resampling step, the reduction of the complexity of the filter accompanied with the direct relationship of the resampled filtered signal is still beneficial.

To that end, in one embodiment of the invention, the discrete spectrum includes a set of overlapping blocks of samples having more than one but less than two samples per symbol. This embodiment resamples 226 the filtered discrete spectrum to an integer number of samples per symbol and transforms 206 the resampled and filtered discrete spectrum in the time domain to produce the second signal.

Figure 3A:
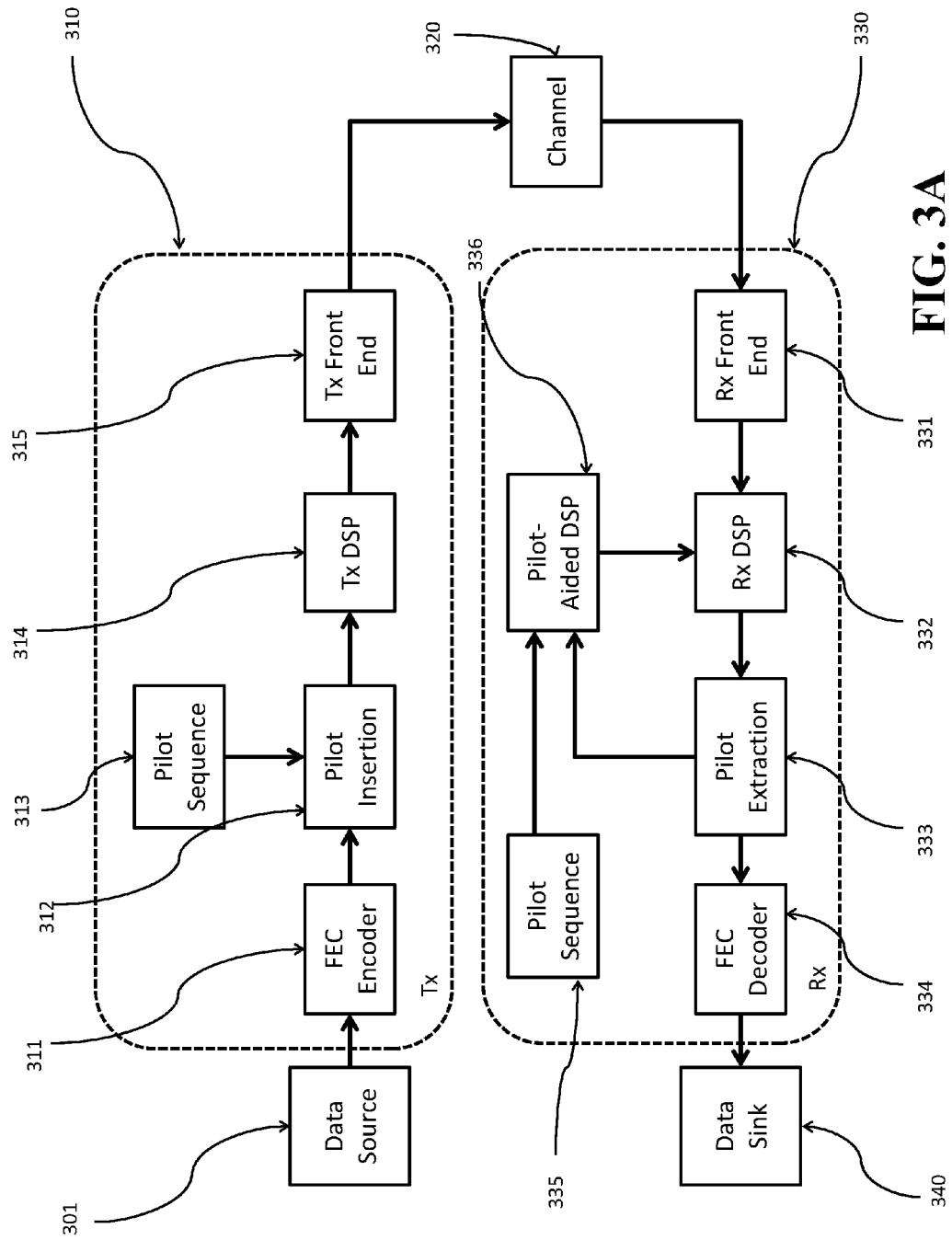
FIG. 3A is a schematic of a pilot-aided optical communications system, according to some embodiments of the invention.

FIG. 3A shows a block diagram of a pilot-aided optical communications system according to some embodiments of the invention. Data from a source (301) are sent to a transmitter (Tx) (310). For example, the data are sent to an optional forward error correction (FEC) encoder (311) and then the data are sent to a pilot insertion block (312), where pilot symbols from a pilot sequence (313) are added at some pre-determined rate to produce a signal including a set of data symbols and a set of pilot symbols with known amplitudes and phases. After insertion of the pilot symbols, the signal undergoes digital signal processing (DSP) (314). In some embodiments, the DSP also performs other functions such as mapping, filtering and pre-equalization. The signal is then sent to the transmitter front end (315), where analog operations such as amplification, filtering, modulation and up-conversion occur, and then transmitted over an optical channel (320) to a receiver (Rx) (330).

At the receiver, the signal passes through the receiver front end (331) for performing analog operations such as down-conversion, amplification, filtering and quantization of the received signal to produce a digital signal. The digital signal is processed by digital algorithms (332), before extraction of the received pilot symbols (333). The extracted pilot symbols are then processed in combination with the transmitted pilot sequence (335) with known amplitudes and phases corresponding to the pilot symbols (313), by the pilot-aided DSP algorithms (336). Information resulting from this processing is then used in the receiver DSP (332) in order to improve accuracy of the equalization and carrier phase recovery. The received signal after pilot extraction is then optionally sent for FEC decoding (334), before being sent to a destination, e.g., a data sink (340).

Figure 3B:
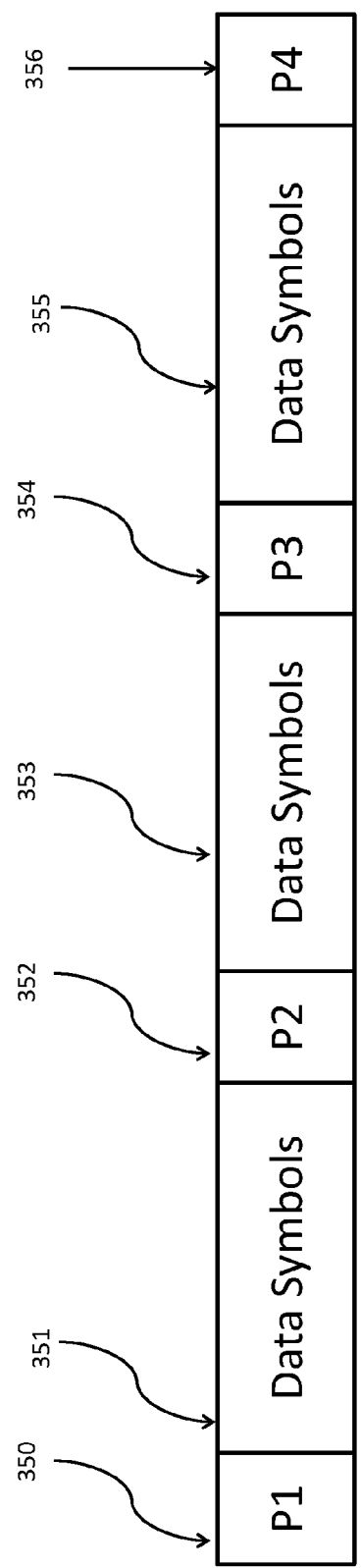
FIG. 3B is an exemplar schematic of the signal structure for a pilot-aided optical communications system, according to some embodiments of the invention.

FIG. 3B shows an exemplar structure of the corresponding digital signal to be encoded. The signal includes a set of data symbols and a set of pilot symbols with known amplitudes and phases according to some embodiments of the invention. Several pilot symbols (350, 352, 354, and 356) are distributed through several blocks of data symbols (351, 353, and 355). Digital signal processing on a single block of data symbols (353) can be performed using adjacent pilot symbols (352, 354) and/or non-adjacent pilot symbols (350, 356).

Figure 4A:
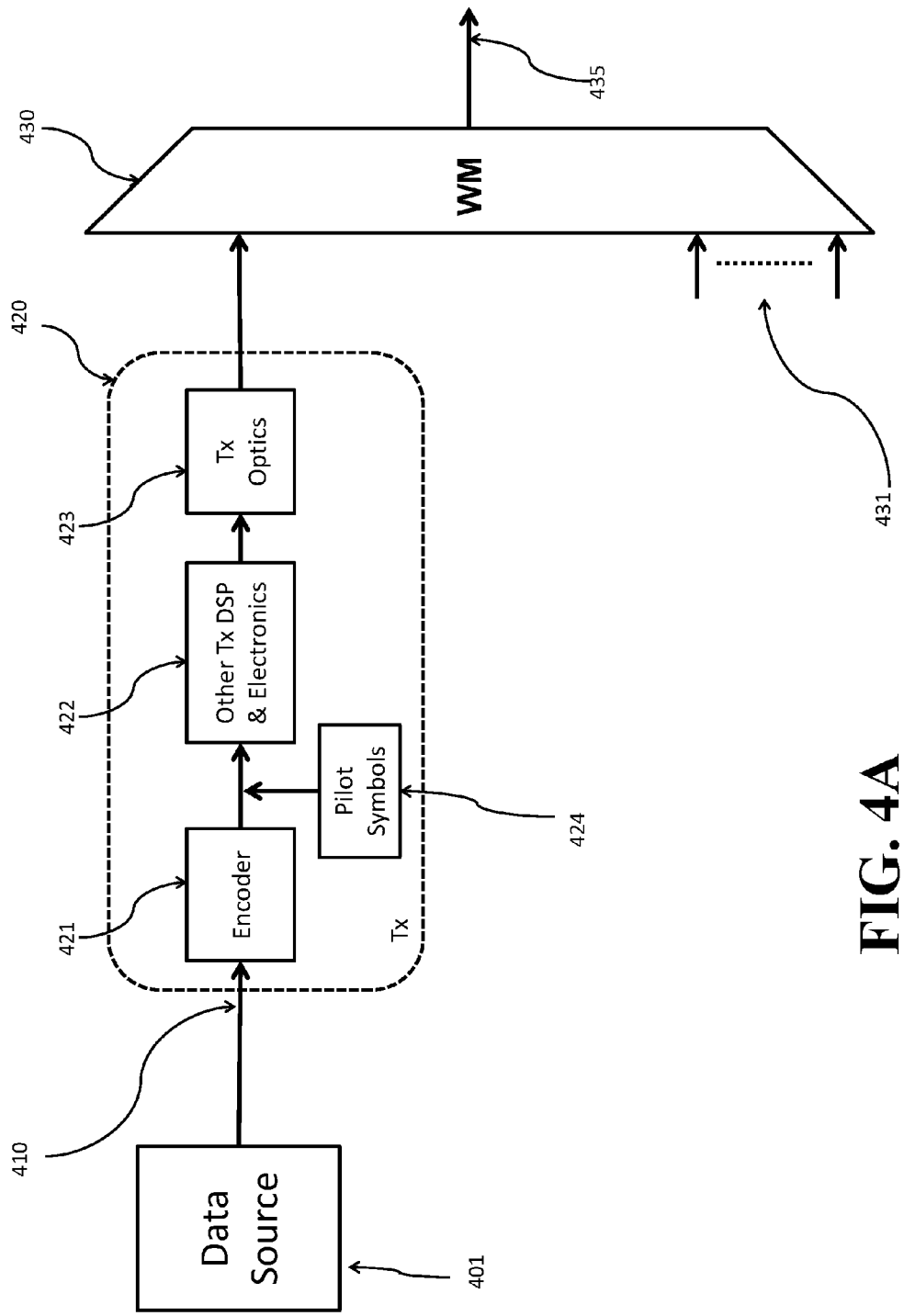
FIG. 4A is a block diagram of a transmitter for a pilot-aided optical communications system according to one embodiment of the invention.

FIG. 4A shows a block diagram of a transmitter for a pilot-aided optical communications system according to one embodiment of the invention. Data (410) from a source (401) are sent to a transmitter (420). In the transmitter, the data are encoded by an FEC encoder (421), before pilot symbols (424) are inserted intermittently. The signal then undergoes processing with DSP algorithms and other front end electronics (422) such as analog-to-digital convertors. The signal is then sent to the transmitter optics (423) for modulation on to the optical carrier. The optical signal is then sent to a wavelength multiplexer (WM) (430), where the signal can be optionally combined with other optical signals which have different wavelengths (431), before being sent to the optical channel (435).

Figure 4B:
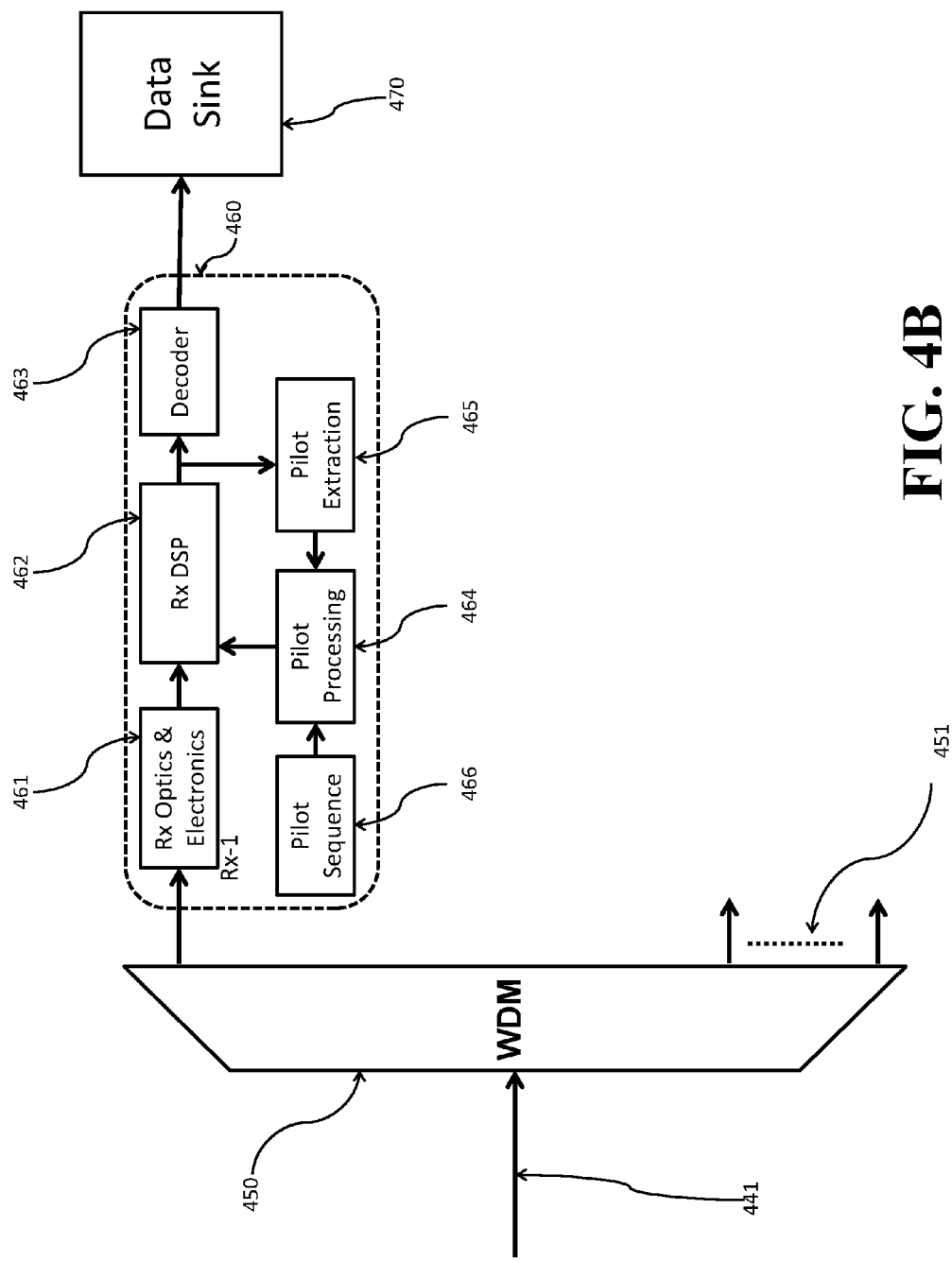
FIG. 4B is a block diagram of a receiver for a pilot-aided optical communications system according to one embodiment of the invention.

FIG. 4B shows a block diagram of a receiver in the pilot-aided optical communications system according to one embodiment of the invention. The signal from the optical channel (441) is sent to a wavelength de-multiplexer (WDM) (450). Other wavelengths (451) are optionally sent to other receivers for processing independently of the wavelength channel of interest. The signal is then sent to the receiver (460). The optical signal is detected by the optical receiver front end (461). This block can include both optical and electronic elements, such as down-conversion, amplification, and quantization. The digital signal is then processed by DSP algorithms (462). After DSP processing, the received pilot symbols are extracted (465), and processed (464) in combination with the known transmitted sequence (466) of pilot symbols. Information from this pilot processing is then used in the Rx DSP (462) that includes an equalizer for functions such as amplitude and phase equalization. The processed signal is then sent for demodulation module (463) to produce soft-decision information for FEC decoding, before being sent to its final destination, e.g., the data sink (470).

Figure 5A:
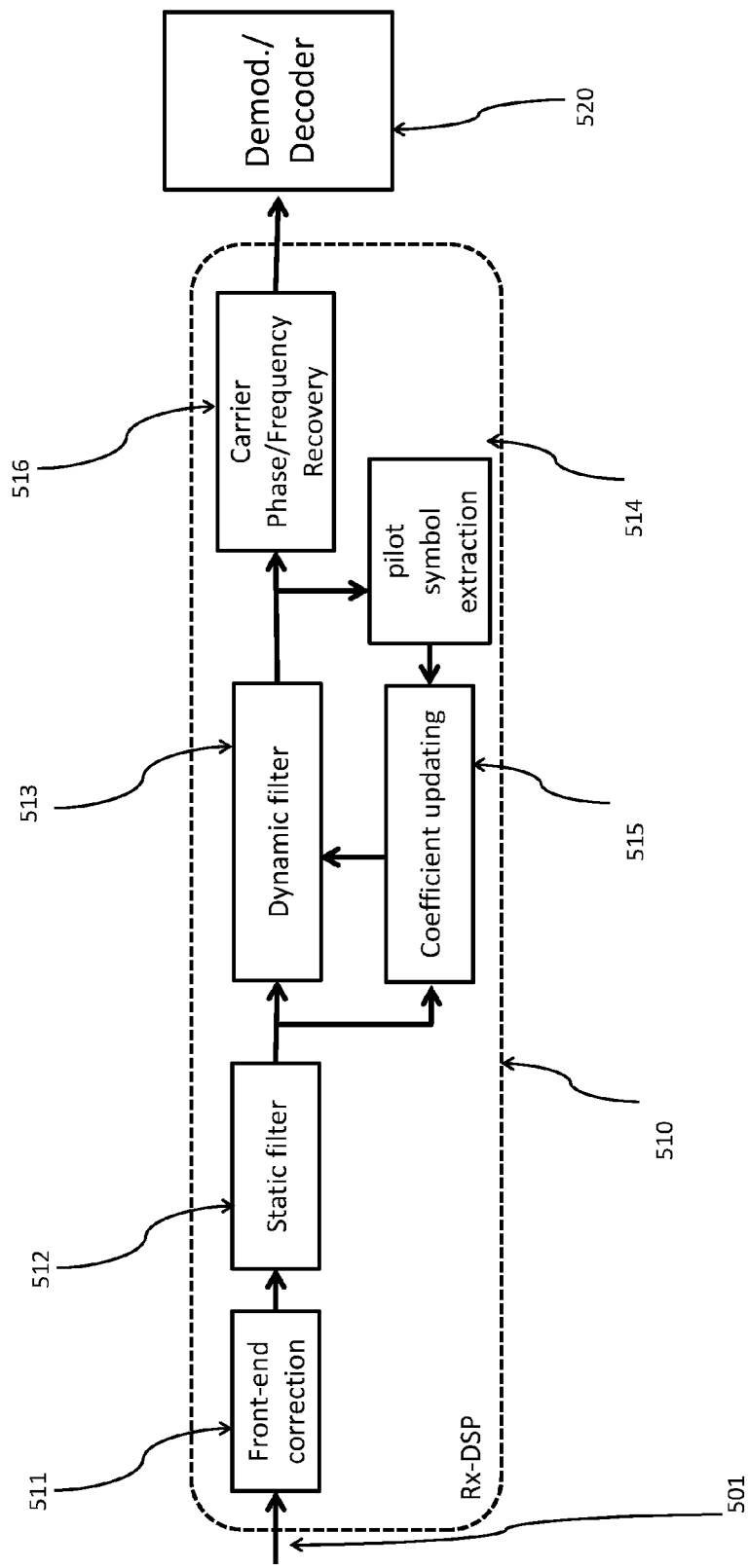
FIG. 5A is a schematic of filtering static and dynamic effects in the frequency domain for a pilot-aided optical communications system according to one embodiment of the invention.

FIG. 5A shows a block diagram of the pilot-aided digital receiver subsystem according to one embodiment of the invention. Digital signals from the quantizer (501) are processed with DSP (510). Initially, static and possibly nonlinear processing is performed to correct for imperfections in the optical end electrical receiver front-end (511). Static equalization of the signal is then performed with the static filter (512) to compensate for time-invariant effects such as chromatic dispersion and pulse shaping, which in some cases have extremely long response lengths. Adaptive equalization is then performed with the dynamic filter (513) to correct for unknown distortions (such as those due to electrical filtering), and time-varying distortions such as polarization mode dispersion, which typically have a much shorter response length. The frequency coefficients of the dynamic filter are updated (515) in the time domain based on values of the pilot symbols (514) and predetermined values of the pilot symbols using, e.g. the least mean square (LMS) method. Separate recovery of carrier frequency and phase is then optionally performed (516) to compensate for the difference in optical frequency between the transmitter and receiver signals, and the random fluctuations in their phases. The signal is then sent for demodulation and decoding (520).

Figure 5B:
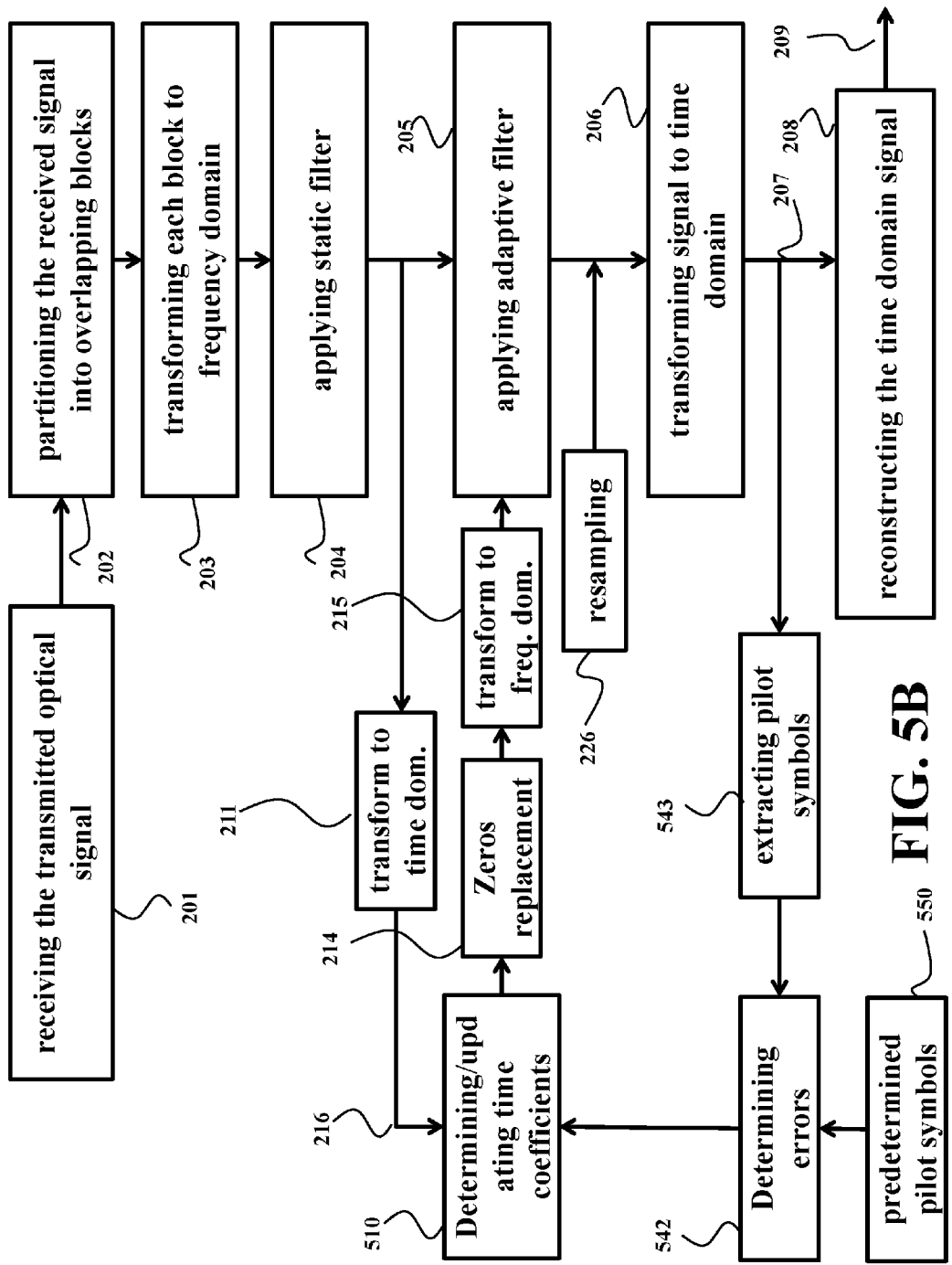
FIG. 5B is a block diagram of a method for pilot aided decoding an optical signal transmitted over an optical channel from a transmitter to a receiver according to one embodiment of the invention.

FIG. 5B shows a block diagram of a method for pilot-aided filtering in the frequency domain according to some embodiments of the invention. In addition to steps described in relation with FIG. 2, in this embodiments the error 542 used for determining the time coefficients is determined using the pilot symbols 543 extracted from the second signal, and the predetermined pilot symbols 550. For example, in one embodiment, the time coefficients are determined 510 based on a function of the first signal, values of the pilot symbols in the second signal, and predetermined values of the pilot symbols 550. For example, we may calculate error terms 542 according to the radiuses of the transmitted 550 and received 543 pilots on each polarization, according to (for example), the constant modulus method according to $$e_x = |p_x|^2 - |v_x|^2$$

$$e_y = |p_y|^2 - |v_y|^2,$$

where $e_x$ and $e_y$ are the error terms on the x and y polarizations respectively, and $p_x$ and $p_y$ are the pilot symbols on the x and y polarizations respectively.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A method for decoding an optical signal transmitted over an optical channel from a transmitter to a receiver, comprising:
   transforming the optical signal received in a time domain over the optical channel into a frequency domain to produce a discrete spectrum;
   updating at least some of time coefficients of a filter for filtering in the time domain;
   transforming the time coefficients into the frequency domain to produce frequency coefficients of the filter for filtering in the frequency domain;
   filtering the discrete spectrum in the frequency domain using the frequency coefficients of the filter;
   transforming the filtered discrete spectrum into a digital signal in the time domain; and decoding symbols of the digital signal, wherein steps of the method are performed using a processor of the receiver, wherein the filter includes a static filter for filtering static effects of the optical channel and a dynamic filter for filtering dynamic effects of the optical channel, wherein the frequency coefficients of the static filter are constant, and wherein the frequency coefficients of the dynamic filter are updated in the time domain.

2. The method of claim 1, wherein the updating comprises:
   transforming the discrete spectrum into the time domain to produce a first signal;
   transforming the filtered digital spectrum into the time domain to produce a second signal;
   determining time coefficients of the filter in the time domain based on a function of the first and the second signals; and
   transforming at least part of the time coefficients in the frequency domain to update the frequency coefficients.

3. The method of claim 2, wherein the transforming into the frequency domain is performed using a Fourier transform, and wherein the transforming into the time domain is performed using an inverse Fourier transform.

4. The method of claim 2, wherein the transforming the time coefficients comprises:
   updating the time coefficients by replacing a subset of time coefficients with zeros; and
   transforming the updated time coefficients into the frequency domain.

5. The method of claim 2, wherein the discrete spectrum includes a set of overlapping blocks of samples having more than one but less than two samples per symbol, further comprising:
   resampling the filtered discrete spectrum to an integer number of samples per symbol;
   transforming the resampled and filtered discrete spectrum in the time domain to produce the second signal;
   determining an error between at least some samples in the second signal and a set of predetermined values; and
   updating the time coefficients using the first signal adjusted according to the error.

6. The method of claim 1, wherein the optical signal includes a set of pilot symbols, and wherein the updating comprises:
   transforming the discrete spectrum into the time domain to produce a first signal;
   transforming the filtered discrete spectrum into the time domain to produce a second signal;
   determining time coefficients of the filter in the time domain based on a function of the first signal, values of the pilot symbols in the second signal, and predetermined values of the pilot symbols;
   updating the time coefficients by replacing a subset of time coefficients with zeros; and
   transforming the updated time coefficients into the frequency domain.

7. A method for decoding an optical signal transmitted over an optical channel from a transmitter to a receiver, comprising:
   receiving the optical signal transmitted over the optical channel to produce a digital signal in a time domain;
   partitioning the digital signal in the time domain into a set of overlapping blocks of samples;
   transforming a block of samples into a frequency domain to produce a discrete spectrum;
   filtering the discrete spectrum with a static filter to produce a first filtered spectrum;
   filtering the first filtered spectrum with a dynamic filter to produce a second filtered spectrum;
   transforming the first filtered spectrum into the time domain to produce a first signal;
   transforming the second filtered spectrum into the time domain to produce a second signal;
   determining time coefficients of the dynamic filter in the time domain based on a difference between at least some elements of the first and the second signals;
   updating the time coefficients by replacing a subset of time coefficients with zeros;
   transforming the updated time coefficients into the frequency domain;
   updating frequency coefficients of the dynamic filter in the frequency domain with the updated time coefficients transformed into the frequency domain; and
   reconstructing the optical signal in the time domain using a set of second digital signals corresponding to the set of overlapping blocks of samples, wherein steps of the method are performed using a processor of the receiver.

8. The method of claim 7, wherein the block of samples includes more than one but less than two samples per symbol, further comprising:
   resampling the second filtered discrete spectrum to an integer number of samples per symbol;
   transforming the resampled and filtered second discrete spectrum in the time domain to produce the second signal;
   determining an error between at least some samples in the second signal and a set of predetermined values; and
   updating the time coefficients using the first signal adjusted according to the error.

9. The method of claim 7, wherein the optical signal includes pilot symbols, and wherein the time coefficients are determined based on a function of the first signal, values of the pilot symbols in the second signal, and predetermined values of the pilot symbols.

10. A receiver for receiving and decoding an optical signal transmitted over an optical channel, comprising:
    a frond end including an optic and an electronic for receiving the optical signal in a time domain over the optical channel and transforming the optical signal into a frequency domain to produce a discrete spectrum, wherein the optical signal includes pilot symbols;
    a digital signal processor for filtering the discrete spectrum in the frequency domain using frequency coefficients of a filter and for transforming the filtered discrete spectrum into a digital signal in the time domain, wherein the processor updates at least some of time coefficients of the filter for filtering in the time domain and transforms the time coefficients into the frequency domain to produce the frequency coefficients of the filter;

transforms the discrete spectrum into the time domain to produce a first signal;

transforms the filtered digital spectrum into the time domain to produce a second signal;

determines time coefficients of the filter in the time domain based on a function of the first signal, values of the pilot symbols in the second signal, and predetermined values of the pilot symbols;

updates the time coefficients by replacing a subset of time coefficients with zeros; and transforms the updated time coefficients into the frequency domain; and a decoder for decoding symbols of the digital signal, wherein the filter includes a static filter for filtering static effects of the optical channel and a dynamic filter for filtering dynamic effects of the optical channel, wherein the frequency coefficients of the static filter are constant, and wherein the frequency coefficients of the dynamic filter are updated in the time domain.

* * * * *